United States Patent [19]

Fest et al.

[11] 4,065,292
[45] Dec. 27, 1977

[54] HERBICIDAL AGENTS

[75] Inventors: Christa Fest, Wuppertal; Edgar Enders, Cologne; Ludwig Eue, Leverkusen; Robert R. Schmidt, Cologne, all of Germany

[73] Assignee: Bayer Aktiengesellschaft, Leverkusen, Germany

[21] Appl. No.: 719,491

[22] Filed: Sept. 1, 1976

[30] Foreign Application Priority Data

Sept. 24, 1975 Germany .............................. 2542468

[51] Int. Cl.$^2$ ............................................. A01N 9/14
[52] U.S. Cl. ......................................................... 71/99
[58] Field of Search ............................................... 71/99

[56] References Cited

U.S. PATENT DOCUMENTS

| 2,655,447 | 10/1953 | Todd | 71/99 |
| 3,236,624 | 2/1966 | Martin et al. | 71/99 |
| 3,457,292 | 7/1969 | Johnson | 71/99 X |
| 3,912,489 | 10/1975 | Fischer | 71/99 X |

FOREIGN PATENT DOCUMENTS

| 1,533,815 | 6/1968 | France | 71/99 |
| 959,228 | 5/1964 | United Kingdom | 71/99 |

OTHER PUBLICATIONS

Harris, Chem. Abst., vol. 58 - 9571e.

Primary Examiner—Lewis Gotts
Assistant Examiner—Catherine L. Mills
Attorney, Agent, or Firm—Burgess, Dinklage & Sprung

[57] ABSTRACT

Herbicidal methods employing, as an active herbicidal ingredient, N-(3,4-dichlorophenyl)-N',N'-dimethylthiourea of the formula

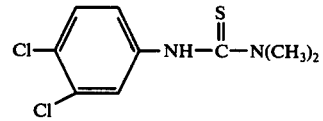

alone or in admixture with a diluent or carrier.

5 Claims, No Drawings

HERBICIDAL AGENTS

The present invention relates to herbical methods employing, as an active herbical ingredient, N-(3,4-dichlorophenyl)-N',N'-dimethylthiourea.

The latter compound is known as an insecticide, the insecticidal action of N-(3,4-dichlorophenyl)-N',N'-dimethylthiourea being disclosed in Bull. Res. Counc. of Israel, Vol. 7A, 1958, page 135-137.

It is also known that certain N-phenylthioureas, for example N-(3-methylphenyl)-N', N'-dimethylthiourea, exert a herbicidal action. They can be employed selectively in beets, potatoes and onions (see British patent specification No. 839,797). Further, it is known that N-(4-chlorophenyl and 4-bromophenyl)-N',N'-dimethylthioureas can be used for combating grasses for example *Sorghum halepense* and *Agropyron repens*. However, the action of these compounds is not satisfactory if low amounts are used and furthermore the compounds are only active if they are sprayed on the grasses by the post-emergence process (see U.S. Pat. No. 2,665,447).

It is known from DDR (East German) Pat. No. 110,155 that N-(4-chlorophenyl)-N',N'-dimethylthiourea is unsuitable for combating wild millet (*Echinochloa crus-galli* and *Seteria* spp.).

The present invention provides a method of combating weeds which comprises applying to the weeds or to a weed habitat N-(3,4-dichlorophenyl)-N',N'-dimethylthiourea of the formula

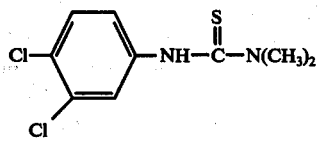

alone or in admixture with a diluent or carrier.

Surprisingly, N-(3,4-dichlorophenyl)-N',N'-dimethylthiourea shows a good herbicidal action only only in the post-emergence process but also in the pre-emergence process, in contrast to the known thioureas of analogous structure and of the same type action. It is particularly noteworthy that the thiourea of the formula (I) can be employed, in the pre-emergence process, even in maize, for combating grasses, for example, *Echinochloa, Digitaria, Setaria* and *Sorghum halepense*, without damaging the crop plants. This was not to be expected directly, since the corresponding ureas, for example N-(3,4-dichlorophenyl)-N',N'-dimethylurea, have a distinct phytotoxic action in maize (see U.S. Pat. No. 2,665,445) and the previously known thioureas of similar structure are not suitable for combating wild millets (see DDR (East German) Pat. No. 110,155. The new use of N-(3,4-dichlorophenyl)-N',N'-dimethylthiourea thus represents a genuine enrichment of the art.

N-(3,4-Dichlorophenyl)-N',N'-dimethylthiourea is already known, as is its manufacture, for example from 3,4-dichlorophenyl isothiocyanate and dimethylamine in alcoholic solution, and its insecticidal action (see Bull. Res. Counc. of Israel, Vol. 7A, 1958, page 135-137). However, its use as a herbicide is new.

The active compound to be used according to the invention influences plant growth and can therefore be used as a defoliant, desiccant, agent for killing broad-leaved plants and germination inhibitor and, in particular, as a weed killer. Weeds in the broadest sense are to be understood as all plants which grow in locations where they are undesired. Whether the active compound to be used according to the invention act as total or selective herbicides depends essentially on the amount used.

By way of example, the active compound can be used, according to the invention, in connection with the following plants:

Dicotyledon weeds such as mustard (Sinapis), cress (Lepidium), bed straw (Galium), chickweed (Stellaria), camomile (Matricaria), mayweed (Anthemis), gallant soldier (Galinsoga), goosefoot (Chenopodium), annual nettle (Urtica), groundsel (Senecio), pigweed (Amaranthus), purslane (Portulaca), cocklebur (Xanthium), bindweed (Convolvulus), morning glory (Ipomoea), knotweed (Polygonum), sesbania (Sesbania), ragweed (Ambrosia), spear thistle (Cirsium), common thistle (Carduus), sow thistle (Sonchus), nightshade (Solanum), field cress (Rorippa), toothcup (Rotala), (Lindernia), deadnettle (Lamium), speedwell (Veronica), mallow (Abutilon), emex (Emex), thornapple (Datura), voilet (Viola), hemp-nettle (Galeopsis), poppy (Papaver) and knapweed (Centaurea);

Dicotyledon cultures such as cotton (Gossypium), soya bean (Glycine), beet (Beta), carrot (Daucus), bean (Phaseolus), pea (Pisum), potato (Solanum), flax (Linum), morning glory (Ipomoea), broad bean (Vicia), tobacco (Nicotiana), tomato (Lycopersicon), groundnut (Arachis), cabbage (Brassica), lettuce (Lactuca), cucumber (Cucumis) and marrow (Cucurbita);

Monocotyledon weeds such as barnyard grass (Echinochloa), foxtail (Seteria), wild millet (Panicum), crabgrass (Digitaria), timothy (Phleum), bluegrass (Poa), fescue (Festuca), goosegrass (Eleusine), signalgrass (Brachiaria), ryegrass (Lolium), cheat (Bromus), oats (Avena), flatsedge (Cyperus), sorghum (Sorghum), quackgrass (Agropyron), Bermuda grass (Cynodon), Monocharia, fimbristylis (Fimbristylis), arrowhead (Sagittaria), spikerush (Eleocharis), bulrush (Scirpus), paspalum (Paspalum), Ischaemum, gooseweed (Sphenoclea), crowfoot grass (Dactyloctenium), redtop (Agrostis), meadow foxtail (Alopercurus) and silky bent-grass (Apera), and Monocotyledon cultures such as rice (Oryza), maize (Zea), wheat (Triticum), barley (Hordeum), oats (Avena), rye (Secale), sorghum (Sorghum), millet (Panicum), sugar cane (Saccharum), pineapple (Ananas), asparagus (Asparagus) and leek (Allium).

However, the use of active compound according to the invention is in no way restricted to the genera indicated above, but extends in the same manner also to other plants.

Equally, the compound can be employed for combating weeds in perennial cultures, for example afforestation, decorative tree plantings, orchards, vineyards, citrus plantations, nut plantings, banana plantations, coffee plantations, tea plantations, rubber plantations, oil palm plantations, cocoa plantations, soft fruit plantations, soft fruit plantings and hop fields, and for the selective combating of weeds in annual cultures.

To broaden the spectrum of action, yet other herbicides can be admixed to agents containing the above compound, for example herbicides from the series of the triazines, such as halogeno-diamino-s-triazines, alkoxy- and alkylthio-diamino-s-triazines, triazoles, diazines, such as uracils, aliphatic carboxylic acids and halogeno-carboxylic acids, halogenated benzoic acids and phenyl-acetic acids, aryloxy-alkanecarboxylic acids, hydrazides, amides, nitriles and esters of such carboxylic acids, carbamic acid esters and thiocarbamic acid esters, ureas and the like.

Representatives of such herbicidal active compounds which can be admixed to the compound of the formula (I) are, for example, the following compounds: 2-chloro-4,6-bis-(ethylamino)-s-triazine, 2-chloro-4-etylamino-6-isopropylamino-s-triazine, 2-chloro-4,6-bis-(methoxy-propylamino)-s-triazine, 2-methoxy-4,6-bis-(isopropylamino)-s-triazine, 2-diethylamino-4-isopropylacetamido-6-methoxy-s-triazine, 2-isopropylamino-4-methoxypropylamino-6-methylthio-s-triazine, 2-methylthio-4,6-bis-(isopropylamino)-s-triazine, 2-methylthio-4,6-bis-(ethylamino)-s-triazine, 2-methylthio-4-ethylamino-6-isopropylamino-s-triazine, 2-methoxy-4-ethylamino-6-isopropylamino-s-triazine, 2-methoxy-4,6-bis-(ethylamino)-s-triazine, 2-chloro-4,6-bis-(isopropylamino)-s-triazine, 5-bromo-3-sec.butyl-o-methyl-uracil, 4-amino-b-chloro-1-phenyl-pyridan-6-one, 3,6-dioxo-1,2,3,6-tetrahydropyridazine, dinitro-sec.butylphenol and its salts, pentachlorophenol and its salts, trichloroacetic acid and its salts, 2,2-dichloropropionic acid and its salts, 2-chloro-N,N-diallylacetic acid amide, maleic acid hydrazide, 2,3,6-trichlorobenzoic acid and its salts, 2,3,5,6-tetrachlorobenzoic acid and its salts, 2-methoxy-3,5,6-trichlorobenzoic acid and its salts, 2-methoxy-3,6-dichlorobenzoic acid and its salts, 3-amino-2,5-dichlorobenzoic acid and its salts, 3-nitro-2,5-dichlorobenzoic acid and its salts, 2-methyl-3,6-dichlorobenzoic acid and its salts, 2,6-dichlorobenzonitrile, 2,6-dichlorothiobenzamide, 2,3,6-trichlorophenylacetic acid and its salts, 2,4-dichlorophenoxyacetic acid and its salts, 2,4,5-trichlorophenoxyacetic acid, its salts and esters, (2-methyl-4-chlorophenoxy)-acetic acid, its salts and esters, 2-(2,4,5-trichlorophenoxy)-propionic acid, its salts and esters, 2-(2,4,5-trichlorphenoxy)-ethyl 2,2-dichloropropionate, 4-(2,4-dichlorophenoxy)-butyric acid, its salts and esters, 4-(2-methyl-4-chlorophenoxy)-butyric acid, its salts and esters, 2,3,6-trichlorobenzyloxypropanol, 4-amino-3,5,6-trichloropicolinic acid, 3 -cyclooctyl-1,1-dimethyl-urea, 3-phenyl-1,1-dimethyl-urea, 3-(4-chlorophenyl)-1,1-dimethyl-urea, 3-(3-trifluoromethylphenyl)-1,1-dimethyl-urea, 3-(3,4-dicholorphenyl)-1,1-dimethyl-urea, 3-(3,4-dichlorophenyl)-1-n-butyl-1-methyl-urea, 3-(3,4-dichlorophenyl)-1,1,3-trimethylurea, 3-(3,4-dichlorophenyl)-1,1-diethyl-urea, 3-(4-chlorophenyl)-1-methoxy-1-methyl-urea, 3-(3,4-dichlorophenyl)-1-methoxy-1-methyl-urea, 3-(4'-bromophenyl)-1-methoxy-1-methyl-urea, 3-(3,4-dichlorophenyl)-3-methoxy-1,1-dimethylurea, 3-(4-chlorophenoxyphenyl)-1,1-dimethylurea, N,N-di-(n-propyl)-S-ethyl-thiocarbamic acid ester, N,N-di-(n-propyl)-S-n-propyl-thiocarbamic acid ester, N-ethyl-N-(n-butyl)-S-n-propyl-thiocarbamic acid ester, N-phenyl-O-isopropyl-carbamic acid ester, N-(3-chlorphenyl)-O-isopropyl-carbamic acid ester, N-(3-chlorophenyl)-O-4-chloro-but-2-inyl-carbamic acid ester and N-(3,4-dichlorophenyl)-O-methyl-carbamic acid ester.

The active compound to be used according to the present invention can be converted into the usual formulations, such as solutions, emulsions, suspensions, powders, pastes and granulates. These may be produced in known manner, for example by mixing the active compound with extenders, that is, liquid or solid or liquefied gaseous diluents or carriers, optionally with the use of surface-active agents, that is, emulsifying agents and/or dispersing agents and/or foam-forming agents. In the case of the use of water as an extender, organic solvents can, for example also be used as auxiliary solvents.

As liquid diluents or carriers, there are preferably used aromatic hydrocarbons, such as xylenes, toluene, benzene or alkyl naphthalenes, chlorinated aromatic or aliphatic hydrocarbons, such as chlorobenzenes, chloroethylenes or methylene chloride, aliphatic hydrocarbons, such as cyclohexane or paraffins, for example mineral oil fractions, alcohols, such as butanol or glycol as well as their ethers and esters, ketones, such as acetone, methyl ethyl ketone, methyl isobutyl ketone or cyclohexanone, or strongly polar solvents, such as dimethyl formamide, dimethyl sulphoxide or acetonitrile, as well as water.

By liquefied gaseous diluents or carriers are meant liquids which would be gaseous at normal temperatures and pressures, for example aerosol propellants, such as halogenated hydrocarbons, for example freon.

As solid diluents or carriers, there are preferably used ground natural minerals, such as kaolins, clays, talc, chalk, quartz, attapulgite, montmorillonite or diatomaceous earth, or ground synthetic minerals, such as highly-dispersed silicic acid, alumina or silicates.

Preferred examples of emulsifying and foam-forming agents include non-ionic and anionic emulsifiers, such as polyoxethylene-fatty acid esters, polyoxyethylene-fatty alcohol ethers, for example alkylarylpolyglycol ethers, alkyl sufonates, alkyl sulfates and aryl sulfonates as well as albumin hydrolyzation products; and preferred examples of dispersing agents include lignin, sulfite waste liquors and methyl cellulose.

The active compound according to the invention can be applied either before or after the emergence of the plant. The amount used is usually between 1 and 20 kg/ha, preferably between 2 and 15 kg/ha.

The present invention also provides means of yielding crops protected from damage by weeds by being grown in areas in which immediately prior to and/or during the time of the growing, the compound of the formula (I) was applied, alone or in admixture with a diluent or carrier.

The good herbicidal activity and the good toleration by maize may be seen from the biotest Example which follows:

EXAMPLE A

Pre-emergence Test

Solvent: 5 parts by weight of acetone
Emulsifier: 1 part by weight of alkylaryl polyglycol ether.

The produce a suitable preparation of active compound, 1 part by weight of active compound was mixed with the stated amount of solvent, the stated amount of emulsifier was added and the concentrate was diluted with water to the desired concentration.

Seeds of the test plants were sown in normal soil and, after 24 hours, watered with the preparation of the active compound. It was expedient to keep constant the amount of water per unit area. The concentration of the active compound in the preparation was of no importance only the amount of active compound applied per unit area being decisive. After 3 weeks, the degree of damage to the plants was determined in % damage in comparison to the development of the untreated control. The figures denote:

0% = no action (like untreated control)

100% = total destruction

The active compounds, the amounts applied and the results can be seen from the table which follows:

Table A

| Active compound | Amount of active compound used, kg/ha | Maize | Echinochloa crus-galli | Digitaria spec. | Sorghum halepense | Amaranthus retrofl. | Polygonum persicaria |
| --- | --- | --- | --- | --- | --- | --- | --- |
| 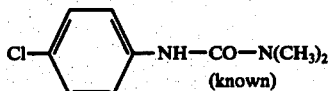 Cl—[ring]—NH—CO—N(CH₃)₂ (known), Cl | 10 | 60 | 100 | 100 | 90 | 100 | 100 |
|  | 5 | 40 | 100 | 85 | 80 | 100 | 100 |
|  | 2.5 | 20 | 100 | 80 | 40 | 100 | 100 |
| 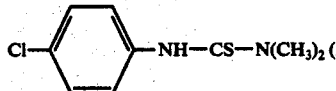 Cl—[ring]—NH—CS—N(CH₃)₂ (I), Cl | 10 | 0 | 100 | 100 | 100 | 100 | 100 |
|  | 5 | 0 | 100 | 100 | 100 | 100 | 100 |
|  | 2.5 | 0 | 100 | 95 | 70 | 100 | 100 |

It will be understood that the specification and examples are illustrative but not limitative of the present invention and that other embodiments within the spirit and scope of the invention will suggest themselves to those skilled in the art.

What is claimed is:

1. A method of combating weeds in corn which comprises applying to the corn habitat prior to weed emergence an effective amount of N-(3,4-dichlorophenyl)-N',N'-dimethylthiourea of the formula

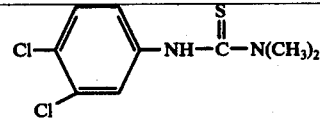

2. A method as claimed in claim 1 in which the dimethylthiourea is applied to an area or agriculture in an amount of 1 to 20 kg per hectare.

3. A method as claimed in claim 2 in which the dimethylthiourea is applied to an area of agriculture in an amount of 2 to 15 kg per hectare.

4. A method as claimed in claim 1 wherein the said dimethylthiourea is applied in admixture with a herbicidally acceptable carrier.

5. A method according to claim 1 wherein the dimethylthiourea is applied at a rate of between 2.5 and 10 kilograms per hectare to the habitat of said corn.

* * * * *